(12) United States Patent
Gisin et al.

(10) Patent No.: US 7,359,513 B2
(45) Date of Patent: Apr. 15, 2008

(54) QUANTUM CRYPTOGRAPHY PROTOCOL

(75) Inventors: Nicolas Gisin, Vessy (CH); Antonio Acin, Barcelona (ES); Valerio Scarani, Lausanne (CH); Grégoire Ribordy, Genève (CH)

(73) Assignee: Universite de Geneve, Geneva (CH)

( * ) Notice: Subject to any disclaimer, the term of this patent is extended or adjusted under 35 U.S.C. 154(b) by 0 days.

(21) Appl. No.: 10/534,901

(22) PCT Filed: Nov. 12, 2003

(86) PCT No.: PCT/CH03/00738

§ 371 (c)(1),
(2), (4) Date: Oct. 7, 2005

(87) PCT Pub. No.: WO2004/047359

PCT Pub. Date: Jun. 3, 2004

(65) Prior Publication Data

US 2006/0120529 A1 Jun. 8, 2006

Related U.S. Application Data

(60) Provisional application No. 60/426,402, filed on Nov. 15, 2002.

(51) Int. Cl.
*H04K 1/00* (2006.01)
*H04L 9/00* (2006.01)
*H04K 1/02* (2006.01)

(52) U.S. Cl. ................... 380/256; 380/46; 380/252

(58) Field of Classification Search ............... None
See application file for complete search history.

(56) References Cited

U.S. PATENT DOCUMENTS

| 5,999,285 | A * | 12/1999 | Brandt et al. ............ 398/212 |
| 6,289,104 | B1 * | 9/2001 | Patterson et al. .......... 380/283 |
| 6,578,018 | B1 * | 6/2003 | Ulyanov .................. 706/14 |
| 6,748,081 | B1 * | 6/2004 | Dultz et al. .............. 380/277 |
| 2003/0231771 | A1 * | 12/2003 | Gisin et al. ............. 380/255 |

OTHER PUBLICATIONS

Huttner B Et Al., "Quantum cryptography with coherent states", Physical Review A (Atomic, Molecular, and Optical Physics), Mar. 1995, USA, vol. 51, No. 3, pp. 1863-1869.*
Bennett, C, "Quantum Cryptography using any two nonorthogonal states", vol. 68, No. 21, pp. 3121-3124 (May 1992).
Chefles, A et al., "Quantum state separation, unambiguous discrimination and exact cloning", vol. 31, No. 50, pp. 10097-10103 (Dec. 1998).
Gisin, N et al., "Quantum cryptography", vol. 74, No. 1, pp. 145-195 (Jan. 2002).
Huttner, B et al., "Quantum cryptography with coherent states", vol. 51, No. 3, pp. 1863-1869 (Mar. 1995).

* cited by examiner

*Primary Examiner*—Ayaz Sheikh
*Assistant Examiner*—Trang Doan
(74) *Attorney, Agent, or Firm*—Browdy and Neimark, P.L.L.C.

(57) ABSTRACT

An apparatus and method for implementing a quantum cryptography system encoding bit values on approximations of elementary quantum systems with provable and absolute security against photon number splitting attacks. The emitter encodes the bit values onto pairs of non-orthogonal states belonging to at least two sets, and such that there does not exist a single quantum operation allowing to reduce the overlap of the states in all the sets simultaneously.

13 Claims, 2 Drawing Sheets

QUANTUM CRYPTOGRAPHY PROTOCOL

BACKGROUND OF THE INVENTION

1. Field of the Invention

This invention relates generally to the field of quantum cryptography, and more particularly to a method for exchanging a key with guaranteed security using systems vulnerable to photon number splitting (PNS) attacks, i.e. a quantum cryptography protocol robust against PNS attacks.

2. Discussion of Prior Art

If two users possess shared random secret information (below the "key"), they can achieve, with provable security, two of the goals of cryptography: 1) making their messages unintelligible to an eavesdropper and 2) distinguishing legitimate messages from forged or altered ones. A one-time pad cryptographic algorithm achieves the first goal, while Wegman-Carter authentication achieves the second one. Unfortunately both of these cryptographic schemes consume key material and render it unfit for use. It is thus necessary for the two parties wishing to protect the messages they exchange with either or both of these cryptographic techniques to devise a way to exchange fresh key material. The first possibility is for one party to generate the key and to inscribe it on a physical medium (disc, cd-rom, rom) before passing it to the second party. The problem with this approach is that the security of the key depends on the fact that it has been protected during its entire lifetime, from its generation to its use, until it is finally discarded. In addition, it is very unpractical and tedious.

Because of these difficulties, in many applications one resorts instead to purely mathematical methods allowing two parties to agree on a shared secret over an insecure communication channel. Unfortunately, all such mathematical methods for key agreement rest upon unproven assumptions, such as the difficulty of factoring large integers. Their security is thus only conditional and questionable. Future mathematical developments may prove them totally insecure.

Quantum cryptography (QC) is the only method allowing the distribution of a secret key between two distant parties, the emitter and the receiver, [1] with a provable absolute security. Both parties encode the key on elementary quantum systems, such as photons, which they exchange over a quantum channel, such as an optical fiber. The security of this method comes from the well-known fact that the measurement of an unknown quantum state modifies the state itself: a spy eavesdropping on the quantum channel cannot get information on the key without introducing errors in the key exchanged between the emitter and the receiver. In equivalent terms, QC is secure because of the no-cloning theorem of quantum mechanics: a spy cannot duplicate the transmitted quantum system and forward a perfect copy to the receiver.

Several QC protocols exist. These protocols describe how the bit values are encoded on quantum states and how the emitter and the receiver cooperate to produce a secret key. The most commonly used of these protocols, which was also the first one to be invented, is known as the Bennett-Brassard 84 protocol (BB84) [2]. The emitter encodes each bit on a two-level quantum system either as an eigenstate of $\sigma_x$ (|+x⟩ coding for "0" and |−x⟩ coding for "1") or as an eigenstate of $\sigma_y$ (|+y⟩ or |−y⟩, with the same convention). The quantum system is sent to the receiver, who measures either $\sigma_x$ or $\sigma_y$. After the exchange of a large number of quantum systems, the emitter and the receiver perform a procedure called basis reconciliation. The emitter announces to the receiver, over a conventional and public communication channel the basis x or y (eigenstate of $\sigma_x$ or $\sigma_y$) in which each quantum system was prepared. When the receiver has used the same basis as the emitter for his measurement, he knows that the bit value he has measured must be the one which was sent over by the emitter. He indicates publicly for which quantum systems this condition is fulfilled. Measurements for which the wrong basis was used are simply discarded. In the absence of a spy, the sequence of bits shared is error free. Although a spy who wants to get some information about the sequence of bits that is being exchanged can choose between several attacks, the laws of quantum physics guarantee that he will not be able to do so without introducing a noticeable perturbation in the key.

Other protocols—like the Bennett 92 (B92) [3]—have been proposed.

In practice, the apparatuses are imperfect and also introduce some errors in the bit sequence. In order to still allow the production of a secret key, the basis reconciliation part of the protocol is complemented by other steps. This whole procedure is called key distillation. The emitter and the receiver check the perturbation level, also know as quantum bit error rate (QBER), on a sample of the bit sequence in order to assess the secrecy of the transmission. In principle, errors should be encountered only in the presence of an eavesdropper. In practice however, because of the imperfections of the apparatus, a non-zero error probability can also always be observed. Provided this probability is not too large, it does not prevent the distillation of a secure key. These errors can indeed be corrected, before the two parties apply a so called privacy amplification algorithm that will reduce the information quantity of the spy to an arbitrarily small level.

In the last years, several demonstrations of QC systems have been implemented using photons as the information carriers and optical fibers as quantum channels. While the original proposal called for the use of single photons as elementary quantum systems to encode the key, their generation is difficult and good single-photon sources do not exist yet. Instead, most implementations have relied on the exchange between the emitter and the receiver of weak coherent states, such as weak laser pulses, as approximations to ideal elementary quantum systems. Each pulse is a priori in a coherent state $|\mu e^{i\theta}\rangle$ of weak intensity (typically the average photon number per pulse $\mu \approx 0.1$ photons). However since the phase reference of the emitter is not available to the receiver or the spy, they see a mixed state, which can be re-written as a mixture of Fock states, $$\sum_n p_n |n\rangle\langle n|,$$

where the number n of photons is distributed according to Poissonian statistics with mean $\mu$ and $p_n = e^{-\mu} \mu^n / n!$. QC with weak pulses can be re-interpreted as follows: a fraction $p_1$ of the pulses sent by the emitter contain exactly one photon, a fraction $p_2$ two photons, and so on, while a fraction $p_0$ of the pulses are simply empty and do not contribute to the key transmission. Consequently, in QC apparatuses employing weak pulses, a rather important fraction of the non-empty pulses actually contain more than one photon. The spy is then not limited any longer by the no-cloning theorem. He can simply keep some of the photons while letting the others go to the receiver. Such an attack is called photon-number splitting (PNS) attack. If we assume that the only constraints limiting the technological power of the spy are the laws of physics, the following attack is in principle possible: (1) for each pulse, the spy counts the number of photons, using a photon number quantum non-demolition measurement; (2) he blocks the single photon pulses, while keeping one photon of the multi-photon pulses in a quantum memory and forwarding the remaining photons to the receiver using a perfectly transparent quantum channel; (3) he waits until the emitter and the receiver publicly reveal the bases used, and correspondingly measures the photons stored in his quantum memory: he must discriminate between two orthogonal states, and this can be done deterministically. In this way, he obtains full information on the key, which implies that no procedure allows to distillate a secret key for the legitimate users. In addition, the spy does not introduce any discrepancies in the bit sequences of the emitter and the receiver. The only constraint on PNS attacks is that the presence of the spy should remain undetected. In particular, he must ensure that the rate of photons received by the receiver is not modified.

In the absence of the spy, the raw rate of photons that reach the receiver is given by:

$$R_{Receiver}(\delta) = \mu \cdot 10^{-\delta/10} \text{ [photons/pulse]} \quad (1)$$

where $\delta = \alpha L$ is the total attenuation in dB of the quantum channel of length L. Thus, the PNS attack can be performed on all passing pulses only when $\delta \geq \delta_c$ with $R_{Receiver}(\delta_c) \cong p_2$: the losses that the receiver expects because of the fiber attenuation are equal to those introduced by the action of the spy storing and blocking photons. For shorter distances, the spy sends a fraction q of the pulses on her perfectly transparent channel without doing anything and performs the PNS attack on the remaining 1−q fraction of the pulses. The receiver measures a raw detection rate $$R_{Receiver\backslash Spy}(q) = q\mu + (1-q)B \text{ [photons/pulse]} \quad (2)$$

where $$B = \sum_{n \geq 2} p_n(n-1).$$

The parameter q is chosen so that $R_{Receiver\backslash spy}(q) = R_{Receiver}(\delta)$. The information the spy gets on a bit sent by the emitter is 0 when he does nothing, and 1 when he perform the PNS attack, provided of course that the receiver has received at least one photon:

$$I_{Spy}(q) = \frac{(1-q)S}{q + (1-q)S} \text{ [bits/pulse]} \quad (3)$$

with $$S = \sum_{n \geq 2} p_n.$$

The critical length of the quantum channel is determined by the condition $R_{Receiver}(\delta_c) = R_{Receiver\backslash Spy}$ (q=0). For an average photon number $\mu=0.1$, one finds $\delta_c=13$ [dB], which corresponds to a distance of the order of 50 km ($\alpha=0.25$ [dB/km])

Although the PNS attacks are far beyond today's technology, their consequences on the security of a QC system relying on weak coherent states is devastating, when they are included in the security analysis [4]. The extreme vulnerability of the BB84 protocol to PNS attacks is due to the fact that whenever the spy can keep one photon, he gets all the information, since he has to discriminate between two eigenstates of a known Hermitian operator, which is allowed by the laws of quantum physics.

SUMMARY OF THE INVENTION

The primary object of the invention is to allow to exchange a key featuring absolute security with a quantum cryptography apparatus using approximations, such as weak coherent states, to ideal elementary quantum systems.

It covers a new class of protocols for QC in which the emitter encodes each bit onto a pair of non-orthogonal states belonging to at least two suitable sets, which allow to neutralize PNS attacks, and lead thus to a secure implementations of QC with weak coherent states over longer distances than present protocols.

The apparatus of the emitter (see FIG. 1) consists of a source of quantum states and a preparation device. Both of these elements are controlled by a processing unit. A random number generator is connected to this processing unit, in order to allow random preparation of the quantum states. After preparation, these states are sent along a quantum channel to the receiver. The receiver consists of an analysis device followed by a detection unit, both controlled by a processing unit. A random number generator allows the processing unit to randomly choose the analysis basis. The emitter and the receiver are connected by a conventional communication channel.

The emitter encodes each bit in the state of an elementary quantum system, belonging to either of the two sets A={$|0_a\rangle$, $|1_a\rangle$} or B={$|0_b\rangle$, $|1_b\rangle$}, chosen such that $\langle 0_a|1_a\rangle=\eta_a\neq0$, $|\langle 0_b|1_b\rangle|=\eta_b\neq0$, and that there does not exist a single quantum operation, whether probabilistic or not, reducing simultaneously the overlaps of the states within all the sets (see FIG. 2, left).

In order to obtain correlated results with those of the emitter, the receiver has to distinguish between two non orthogonal states. He can do so by implementing in his analysis device a generalized measurement that unambiguously discriminates between these two states at the expense of sometime getting an inconclusive result. Such a measurement can be realized by a selective filtering, whose effect is not the same on all states, followed by a von Neumann measurement on the states that pass the filter. In the example of FIG. 2, this filter, discriminating between the elements of A, is given by $$F_A = \frac{1}{\sqrt{1+\eta}}(|+x\rangle\langle 1_a^{\perp}| + |-x\rangle\langle 0_a^{\perp}|),$$

where $|\psi^{\perp}\rangle$ is the state orthogonal to $|\psi\rangle$. A fraction 1−η of the states of set A passes this filter. For the states that do, the von Neumann measurement of $\sigma_x$ allows their discrimination. The emitter randomly applies on each quantum system one of the two filters $F_A$ or $F_B$, and measures $\sigma_x$ on the outcome. Subsequently, the emitter discloses for each bit to which set A or B the associated quantum system belonged. The receiver then discards all the items in which he has chosen the wrong filter and informs the emitter.

One particular example of a protocol that belongs to this new class amounts to a simple modification of the key distillation procedure applied to bits produced by an apparatus normally used with the BB84 protocol.

The emitter sends randomly one of the four states $|\pm x\rangle$ or $|\pm y\rangle$. He applies the convention that $|\pm x\rangle$ code for 0 and $|\pm y\rangle$ code for 1. For a given state, the receiver measures randomly $\sigma_x$ or $\sigma_y$, which constitutes the most effective unambiguous way to discriminate between these states. After the exchange of a sufficiently large number of states, the emitter announces publicly one of the four pairs of non-orthogonal states $A_{\omega, \omega'} = \{|\omega_x\rangle, |\omega'_y\rangle\}$, with $\omega$, $\omega' \in \{+, -\}$. Within each set, the overlap of the two states is $$\eta = \frac{1}{\sqrt{2}}.$$

Let us assume for example that a $|+x\rangle$ was sent by the emitter, and that he subsequently announced the set $A_{+,+}$. If the receiver has measured $\sigma_x$, which happens with 50% probability, he obtains with certainty the result +1. However, since this outcome is possible for both states in the disclosed set $A_{++}$, it must be discarded. If the receiver has measured $\sigma_y$ and obtained +1, again he cannot decide which state was sent by the emitter. However if he has measured $\sigma_y$ and obtained −1, then he knows that the emitter must have sent $|+x\rangle$ and adds a 0 to his key.

The other steps of key distillation (QBER estimate, error correction and privacy amplification) remain unchanged.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
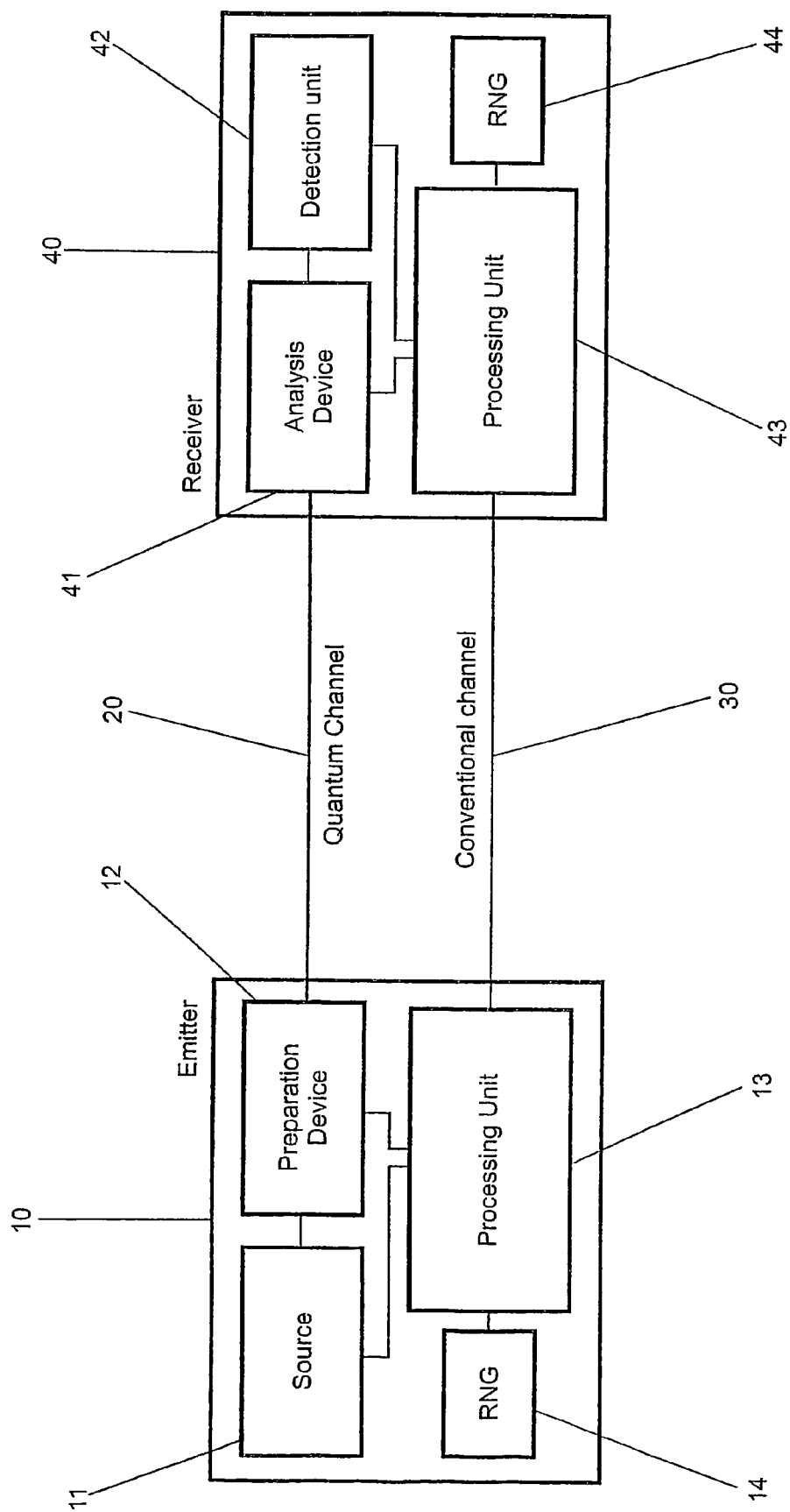
FIG. 1 schematically illustrates one embodiment of the invention.

Referring to FIG. 1, one embodiment of the invention comprises an emitter 10 and a receiver 40 connected by a quantum channel 20 and a conventional channel 30. The emitter consists of a quantum state source 11 and a preparation device 12 controlled by a processing unit 13. A random number generator 14 is connected to the processing unit 13. The receiver 40 consists of an analysis device 41 and a detection unit 42 controlled by a processing unit 43. A random number generator 44 is connected to the processing unit 43.

Figure 2:
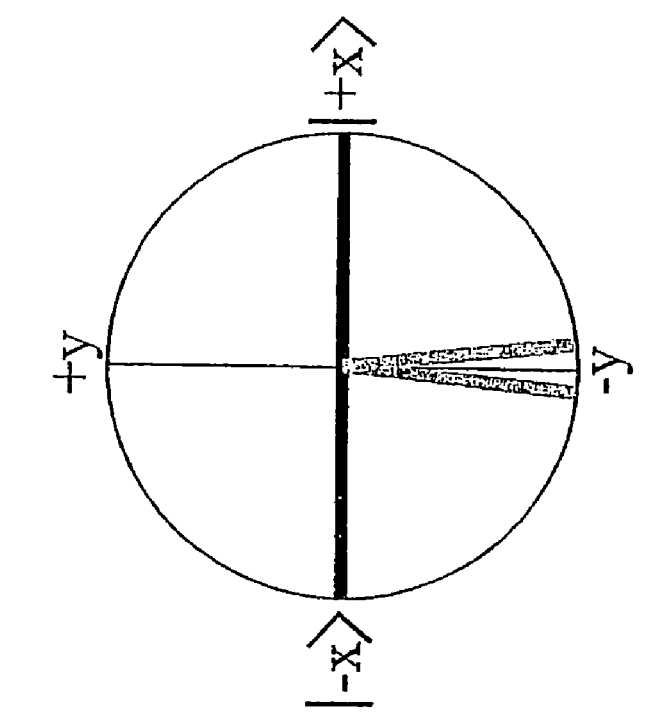
FIG. 2 shows an example of two sets of non-orthogonal states used in the new class of QC protocols, the four states lying in a plane of the Poincaré sphere passing through its center. Effect of the filter $F_A$.
Figure 2:
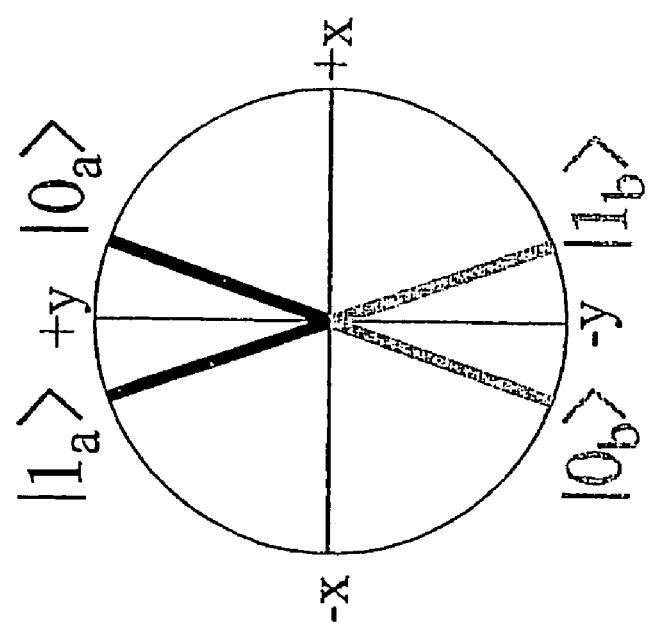

The emitter generates a quantum state using his source 11 and encodes, using the preparation device 12, the value of each bit on this quantum state belonging to either of the two sets $A=\{|0_a\rangle, |1_a\rangle\}$ or $B=\{|0_b\rangle, |1_b\rangle, \}$, chosen such that $|\langle 0_a|1_a\rangle| = \eta_a \neq 0$, $|\langle 0_b|1_b\rangle| = \eta_b \neq 0$, and that there does not exist a single quantum operation, whether probabilistic or not, reducing simultaneously the overlaps of the states within all the sets (see FIG. 2, left). The states are then sent to the receiver on the quantum channel 20.

The receiver uses his analysis device 41 to perform a generalized measurement that unambiguously discriminates between these two states at the expense of sometime getting an inconclusive result. Such a measurement is realized by a selective filtering, whose effect is not the same on all states, followed by a von Neumann measurement on the states that pass the filter. An example of such a filter, discriminating between the elements of A is given by $$F_A = \frac{1}{\sqrt{1+\eta}}(|+x\rangle\langle 1_a^\perp| + |-x\rangle\langle 0_a^\perp|),$$

where $|\psi^\perp\rangle$ is the state orthogonal to $|\psi\rangle$. A fraction $1-\eta$ of the states of set A passes this filter. For the states that do, the von Neumann measurement of $\sigma_x$ allows their discrimination. The detection unit 42 records the outcome of the generalized measurement. The processing unit of the emitter 43 randomly applies on each qubit one of the two filters $F_A$ or $F_B$, and measures $\sigma_x$ on the outcome. Subsequently, the emitter discloses for each bit the set A or B. The receiver then discards all the items in which he has chosen the wrong filter and informs the emitter through messages on the conventional channel 30.

The emitter and the receiver follow then the procedure of key distillation comprising the steps of QBER estimate, error correction and privacy amplification.

This new class of protocols is straightforwardly generalized to the use of quantum systems comprising more than two levels.

It can also be generalized to the cases where more than two sets of states are used.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

REFERENCES

[1] Nicolas Gisin, Grégoire Ribordy, Wolfgang Tittel, and Hugo Zbinden, "Quantum Cryptography", Rev. of Mod. Phys. 74, (2002).
[2] Charles Bennett and Gilles Brassard, in Proceedings IEEE Int. Conf. on Computers, Systems and Signal Processing, Bangalore, India (IEEE, New York, 1984), pp. 175-179.
[3] Charles Bennett, Phys. Rev. Lett. 68, 3121 (1992).
[4] Gilles Brassard, Norbert Lütkenhaus, Tal Mor, and Barry C. Sanders, Phys. Rev. Lett. 85, 1330 (2000).

What is claimed is:

1. A method for exchanging a secure cryptographic key for a quantum cryptography apparatus employing non-ideal elementary quantum systems, wherein
the apparatus comprises an emitter and a receiver, being connected by a quantum channel and a conventional communication channel,
the emitter encodes each bit at random onto a pair of non-orthogonal states belonging to at least two suitable sets,
there is not a single quantum operation reducing the overlap of quantum states of all sets simultaneously,
the emitter sends the encoded bit along the quantum channel to the receiver,
the receiver randomly chooses the analysis measurement within said suitable sets,
the emitter sends the set information along the conventional communication channel,
the receiver discards all received encoded bits for which he has chosen a different analysis measurement incompatible with the set they belonged to and sends an appropriate information to the emitter along the conventional communication channel.

2. The method according to claim 1, wherein in the step of the emitter sending an encoded bit along the quantum channel to the receiver weak coherent states are exchanged between the emitter and the receiver.

3. The method according to claim 2, wherein the weak coherent states are laser pulses with an average photon number per pulse of less than 0.5 photons, preferably less than 0.1 photons.

4. The method according to claim 1,
wherein the emitter is using two sets $A=\{|0_a\rangle, |1_a\rangle\}$ and $B=\{|0_b\rangle, |1_b\rangle\}$, chosen such that $\langle 0_a|1_a\rangle=\eta_a\neq 0$, $\langle 0_b|1_b\rangle=\eta_b\neq 0$, and wherein there is no single quantum operation reducing the overlap of the quantum states of all sets simultaneously, and
the receiver randomly chooses the analysis measurement between $$F_A = \frac{1}{\sqrt{1+\eta}}(|+x\rangle\langle 1_a^\perp| + |-x\rangle\langle 0_a^\perp|) \text{ and}$$

$$F_B = \frac{1}{\sqrt{1+\eta}}(|+x\rangle\langle 1_b^\perp| + |-x\rangle\langle 0_b^\perp|)$$

followed by a Von Neumann measurement distinguishing between $|+x\rangle$ and $|-x\rangle$.

5. The method according to claim 1, wherein after a number of encoded bits has been transmitted, a protocol step is performed, within which emitter and receiver agree on a body of cryptographic key information that is shared between emitter and receiver, but secret from all other units that may be monitoring the quantum channel and the conventional communication channel, or else conclude that the encoded bits can not be safely used as cryptographic key information.

6. A method for exchanging a secure cryptographic key for a quantum cryptography system employing non-ideal elementary quantum states, wherein
the apparatus comprises an emitter and a receiver, being connected by a quantum channel,
the emitter encodes the key values on at least two sets of non-orthogonal quantum states, wherein it is not possible to find a single quantum operation, whether probabilistic or not, that reduces the overlap of the states of all sets simultaneously,
the emitter sends the encoded bit along the quantum channel to the receiver,
the receiver randomly chooses an analysis measurement within said suitable sets,
the emitter sends a set information to the receiver,
the receiver discards all received encoded bits for which it has chosen a different analysis measurement incompatible with the set they belonged to and sends an appropriate information to the emitter.

7. A quantum cryptography system employing non-ideal elementary quantum states to exchange secure cryptographic key information and comprising:
a source of non-ideal elementary quantum states,
an emitter and a receiver, being connected by a quantum channel and a conventional communication channel,
the emitter comprising or connected to a random number generator allowing to prepare random non-orthogonal quantum states belonging to at least two suitable sets, wherein there is no single quantum operation reducing the overlap of the quantum states of all sets simultaneously,
the receiver comprising or connected to a random number generator allowing to choose an analysis measurement for said quantum states,
the emitter being able to send an encoded bit along the quantum channel to the receiver and being able to send a set information along the conventional communication channel,
the receiver being able to discard all received encoded bits for which it has chosen a different analysis measurement and to send an appropriate information to the emitter along the conventional communication channel.

8. The quantum cryptography system according to claim 7, wherein said source is a laser source and the emitter comprises a preparation device sending laser pulses with an average photon number per pulse of less than 0.5 photons, preferably less than 0.1 photons.

9. The quantum cryptography system according to claim 7, wherein emitter and receiver both comprise processing units being able to perform, after a number of encoded bits had been transmitted, a protocol step, within which emitter and receiver agree on a body of cryptographic key information that is shared between emitter and receiver, but secret from all other units that may be monitoring the quantum channel and the conventional communication channel, or else conclude that the encoded bits can not be safely used as cryptographic key information.

10. The method according to claim 1, wherein for each bit, the emitter is randomly using one of the four states $|\pm x\rangle$ or $|\pm y\rangle$ with the convention that $|\pm x\rangle$ code for 0 and $|\pm y\rangle$ code for 1, and sends it along the quantum channel to the receiver, the receiver randomly measures $\sigma_x$ or $\sigma_y$, the emitter announces one of the four pairs of non-orthogonal states $A_{\omega,\omega'}=\{|\omega_x\rangle, |\omega'_y\rangle\}$ with $w,w'\in\{+,-\}$ and such that one of the states is the one which he has sent by sending an appropriate message along the conventional communication channel, the receiver discards all received encoded bits for which the measurement result it has obtained is possible for both states disclosed by the emitter and sends an appropriate information to the emitter along the conventional communication channel, the receiver deduces the state actually sent by the emitter and adds the corresponding bit to the key.

11. The quantum cryptography system according to claim 7, wherein the emitter is adapted to use two sets $A=\{|0_a\rangle, |1_a\rangle\}$ and $B=\{|0_b\rangle, |1_b\rangle\}$, chosen such that $\langle 0_a 1_a\rangle=\eta_a\neq 0$, $\langle 0_b|1_b\rangle=\eta_a\neq 0$, and wherein there is no single quantum operation reducing the overlap of the quantum states of all sets simultaneously, and wherein the receiver is adapted to randomly chooses the analysis measurement between $$F_A = \frac{1}{\sqrt{1+\eta}}(|+x\rangle\langle 1_a^\perp|+|-x\rangle\langle 0_a^\perp|) \text{ and } F_B = \frac{1}{\sqrt{1+\eta}}(|+x\rangle\langle 1_b^\perp|+|-x\rangle\langle 0_b^\perp|)$$

followed by a Von Neumann measurement distinguishing between $|+x\rangle$ and $|-x\rangle$.

12. The quantum cryptography system according to claim 7, wherein for each bit, the emitter is using the related random number generator for randomly using one of the four states $|\pm x\rangle$ or $|\pm y\rangle$ with the convention that $|\pm x\rangle$ code for 0 and $|\pm y\rangle$ code for 1, and the emitter is adapted to send it along the quantum channel to the receiver, wherein the receiver is using the related random number generator for randomly measuring $\sigma_x$ or $\sigma_y$, wherein the emitter is adapted to generate a signal announcing one of the four pairs of non-orthogonal states $A_{\omega,\omega'}=\{|\omega_x\rangle|\omega'_y\rangle\}$ with $w,w'\in\{+,-\}$ and such that one of the states is the one which it has sent by sending an appropriate message along the conventional communication channel, wherein the receiver is adapted to discard all received encoded bits for which the measurement result it has obtained is possible for both states disclosed by the emitter and sends an appropriate information to the emitter along the conventional communication channel, wherein the receiver is adapted to deduce the state actually sent by the emitter and adds the corresponding bit to the key.

13. The quantum cryptography system according to claim 7, wherein the transmittal of an encoded bit along the quantum channel from the emitter to the receiver comprises an exchange of weak coherent states between the emitter and the receiver.

* * * * *